(12) United States Patent
Otani

(10) Patent No.: US 6,964,142 B1
(45) Date of Patent: Nov. 15, 2005

(54) BUILDING MATERIAL FORMED FROM RECYCLED RESOURCES AND INSTALLATION METHOD THEREOF

(76) Inventor: Mitsuru Otani, 7-25, Kitakarasuyama, 1-chome, Setagaya-ku, Tokyo 157-0061 (JP)

( * ) Notice: Subject to any disclaimer, the term of this patent is extended or adjusted under 35 U.S.C. 154(b) by 137 days.

(21) Appl. No.: 10/362,672

(22) PCT Filed: Sep. 13, 2000

(86) PCT No.: PCT/JP00/06264

§ 371 (c)(1),
(2), (4) Date: Feb. 24, 2003

(87) PCT Pub. No.: WO02/16126

PCT Pub. Date: Feb. 28, 2002

(30) Foreign Application Priority Data

Aug. 25, 2000 (JP) .............................. 2000-301225

(51) Int. Cl.[7] .............................................. E04C 2/34
(52) U.S. Cl. .................. 52/794.1; 52/741.3; 52/DIG. 9
(58) Field of Search ........................... 52/900, DIG. 9, 52/794.1, 741.3; 428/903.3

(56) References Cited

U.S. PATENT DOCUMENTS 1,382,095 A * 6/1921 Lambert ..................... 52/723.1
6,044,604 A * 4/2000 Clayton et al. ............. 52/309.9
6,412,247 B1 * 7/2002 Menchetti et al. ......... 52/731.1
2002/0139082 A1 * 10/2002 DeFord et al. ............. 52/783.1

FOREIGN PATENT DOCUMENTS

JP 11131606 * 5/1999

* cited by examiner

Primary Examiner—Milton Nelson, Jr.
(74) Attorney, Agent, or Firm—Douglas E. Jackson; Stites & Harbison, PLLC

(57) ABSTRACT

A building material guarding against a sick house (indoor air pollution) and using coffee grounds after drinking as a recycled resource, and an installation method thereof. A building material giving combined performance effects including sound-proofing/vibration controlling performances added by further mixing into the above building material the shreds or powder of discarded used tires. The building material consisting of recycled resources, characterized by comprising a laminate and a platy material covering the laminate thereinside, the laminate being formed by consolidating with a plaster material a raw material obtained by drying coffee grounds after drinking coffee (made by roasting and grinding coffee beans) or obtained by further roasting the dried coffee grounds; and the building material consisting of recycled resources, characterized by comprising a laminate and a platy material covering the laminate thereinside, the laminate being formed by mixing into the raw material consisting of coffee grounds shreds and/or powder obtained by shredding used tires and further mixing the resultant material into a plaster material for consolidating.

14 Claims, 4 Drawing Sheets

BUILDING MATERIAL FORMED FROM RECYCLED RESOURCES AND INSTALLATION METHOD THEREOF

The present invention deals with a building guarding against a sick house (indoor air pollution) and using coffee grounds after drinking as a recycled resource, and an installation method thereof. It also deals with a building material giving combined performance effects including sound-proofing/vibration controlling performances added by further mixing into the above building material the shreds or powder of discarded used tires.

BACKGROUND TECHNOLOGY

The problem of indoor air pollution is occurring in new residential construction. Specifically, the volatile components of various chemical compounds used in the building materials used in new construction have become a social problem characterized by damage to the health of the residents. For example, the harmful effects of the volatile component of formaldehyde contained in the adhesive that is used to apply wallpaper for interior decorating purposes have been pointed out one important source of indoor air pollution. Technologically, solutions to the present indoor air pollution problem depend on methods such as discontinuing the use of wallpaper adhesives that contain formaldehyde for mold prevention, using ordinary adhesive instead and, for mold prevention, applying wallpaper that uses Japanese paper, which has good air permeability, or using the traditional method of applying plaster. Meanwhile, the disposal of industrial waste has also become a serious problem. As one facet of this problem is the reutilization of tires, automobile tires that can no longer be used. A portion is used as recapped tires and there are also other special-purpose uses, for example, as playground equipment in parks or control devices for ships or points of contact along wharves and piers. However, there are no effective means for their reutilization and the majority is simply discarded when no longer useable. In recent years, however, along with the increase in automobiles, there has also been a steady increase in discarded used tires and their disposal as waste has become a serious problem. Actually, when new automobile tires are mounted, the used tires are abandoned at the tire shop or warehouse or left discarded in open yards in suitable locations. No one is willing to accept them and their disposal is left to scrap dealers who require the payment of charges. As a result, the majority is incinerated and incineration also gives rise to pollution and other problems, as has also been pointed out. However, these discarded used tires that are disposed of as waste contain many useful materials that can be reutilized and, given the many demands for resource reutilization and recycling, developing more effective uses as recycled resources has now become a matter of urgency.

Meanwhile, there is also the issue of coffee, a beverage that we enjoy drinking everyday. Coffee beans, which are used as the raw material of coffee beverages, are appropriately roasted, ground and, after the addition of hot or cold water and filtering, the resulting coffee is consumed as a beverage. Coffee grounds are naturally produced in that process, the use of which is limited to partial use as fertilizer or other conceivable uses, while the vast majority is simply discarded as waste without a second thought. In particular, an enormous volume of coffee grounds is discarded daily at plants that produce canned coffee beverages on a business and commercial basis, which are turned over to waste treatment operations requiring the payment of the expenses involved in disposal. The coffee grounds that remain after coffee is produced as beverages contain a unique fibrous activated carbon component formed of the coffee bean hulls and a unique good quality oil contained therein as well as other components. The above fibrous activated carbon component formed of the coffee bean hulls and the good quality oil component therein remain when the grounds are dried and the moisture is removed. Using the coffee grounds and further roasting them enhances the properties and effects of the activated carbon component, making it possible to provide an ideal health-oriented building material that absorbs and filters formaldehyde and other organic compounds in the indoor air pollution and prevents and removes odors.

DISCLOSURE OF INVENTION

The present invention makes it possible to produce value-added products by reutilizing and recycling the industrial waste generated by certain industries by actively incorporating that into the production processes of other industries rather than discarding it as waste. Specifically, it is for the purpose of obtaining building materials for floors, walls or ceilings that demonstrates the unique effect of activated carbon by using coffee grounds, an industrial waste product, that have been dried or then further roasted for the problem of indoor air pollution, which causes headaches, dizziness and other symptoms due to the volatile component of organic substances contained in residential building materials or the adhesives of laminated panels. In addition, it is also for the purpose of obtaining building materials with compound properties that, at the same time, make it possible to realize the effects of sound- and vibration-proof properties by combining that with the chips and powder obtained by shredding discarded used tires to the above building materials as a sick-house syndrome countermeasure. These materials, which are generated as industrial waste products, have the advantage of being readily available and economically viable and also providing ease of constructability while also suitable for a recycling society.

The present invention deals with building materials consisting of recycled resources characterized by a material obtained by roasting and grinding coffee beans and, subsequent to use as a coffee beverage, drying the resultant coffee grounds or then further roasting them and cladding the material in a panel structure with a laminated structure in the center hardened by the addition of plaster, a building material consisting of recycled resources characterized by a material obtained by roasting and grinding coffee beans and, subsequent to use as a coffee beverage, drying the resultant coffee grounds or then further roasting them and a chipped and/or powdered material obtained by shredding discarded used tires and cladding them in a panel structure with a laminated structure in the center hardened by the addition of plaster, a building material consisting of recycled resources characterized by a material obtained by roasting and grinding coffee beans and, subsequent to use as a coffee beverage, drying the resultant coffee grounds or then further roasting them in a laminated structure hardened by the addition of plaster as the room inner layer and a chipped and/or powdered material obtained by shredding discarded used tires in a laminated structure hardened by the addition of plaster as the room outer layer, both surfaces of which are then clad in a panel structure, a building material consisting of recycled resources as described above characterized by a panel structure consisting of cardboard, veneer paneling, fancy wood paneling, etc., a door material consisting of recycled resources characterized by a chipped and/or powdered material obtained by shredding discarded used tires and a material obtained by roasting coffee beans and drying the resultant coffee grounds or then further roasting them in a laminated structure fixed in place with an adhesive and clad on one surface or both surfaces by the above fancy wood paneling or, if on one surface, clad on the other surface by the above veneer paneling, a door material consisting of the recycled resources described above characterized by the addition of plaster material in the above laminated structure, a floor material consisting of the recycled resources described above characterized by a chipped and/or powdered material obtained by shredding discarded used tires and a material obtained by roasting coffee beans and drying the resultant coffee grounds or then further roasting them in a laminated structure fixed in place with an adhesive and clad on one surface or both surfaces by the above fancy wood paneling or, if on one surface, clad on the other surface by the above veneer paneling, a tatami material consisting of the recycled resources described above characterized by a chipped and/or powdered material obtained by shredding discarded used tires and a material obtained by roasting coffee beans and drying the resultant coffee grounds or then further roasting them in a laminated structure fixed in place with an adhesive and clad on one surface or both surfaces by the above fancy wood paneling or, if on one surface, clad on the other surface by the above veneer paneling, and an installation method utilizing recycled resources characterized by a protective layer formed by combining a material obtained by roasting and grinding coffee beans and drying the resultant coffee grounds or then further roasting them with an adhesive and spraying or applying that material to the interior walls as a sick-house syndrome countermeasure.

IDEAL CONFIGURATION OF THE EMBODIMENTS OF THE PRESENT INVENTION

Figure 1:
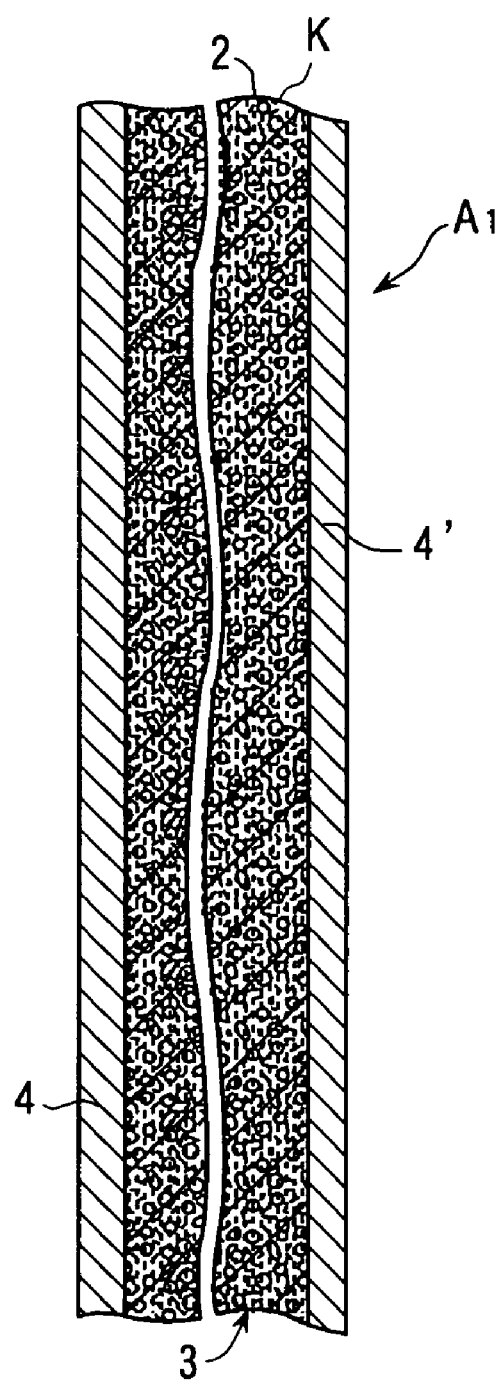
FIG. 1: Diagram illustrating an embodiment of the building material of the present invention

The following is a description of the embodiments of the present invention with reference to the drawings. FIG. 1 illustrates a building material ($A_1$) for wall or ceiling use formed as a unit consisting of laminated structure (3) in the center consisting of activated carbon component (K), that is, a material in powdered form (a degree of latitude is allowed in the coarseness of the material; it may be relatively coarse) obtained by roasting and grinding coffee beans after drinking coffee and drying the resultant coffee grounds or then further roasting and, if necessary, grinding them hardened by the addition of plaster material (2), which is then clad by panel structures (4) and (4'). Here, panel structures (4) and (4') may be constructed of cardboard, veneer paneling or other material and, if cardboard, cardboard with air permeability is optimal, and, if veneer paneling, holes should be made in the material to provide air permeability. Meanwhile, plaster material (2) is fire resistant and, by combining it with activated carbon component (K) in a unit formation, it becomes a building (wall or ceiling) material that has an odor prevention and deodorizing effect due to the action of activated carbon component (K). Specifically, by utilizing this composition with the inclusion of activated carbon component (K), component (K) absorbs the volatile component of organic adhesives used for the application of wallpaper or other wall covering over it, which has an adverse effect on health, provides an odor prevention and deodorizing effect and prevents adverse effects while this component remains volatile.

Figure 2:
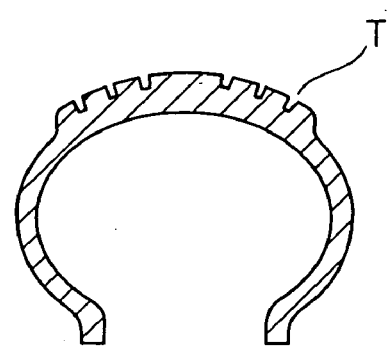
FIG. 2: Diagram of a cross-section of an used tire used in the present invention
Figure 3:
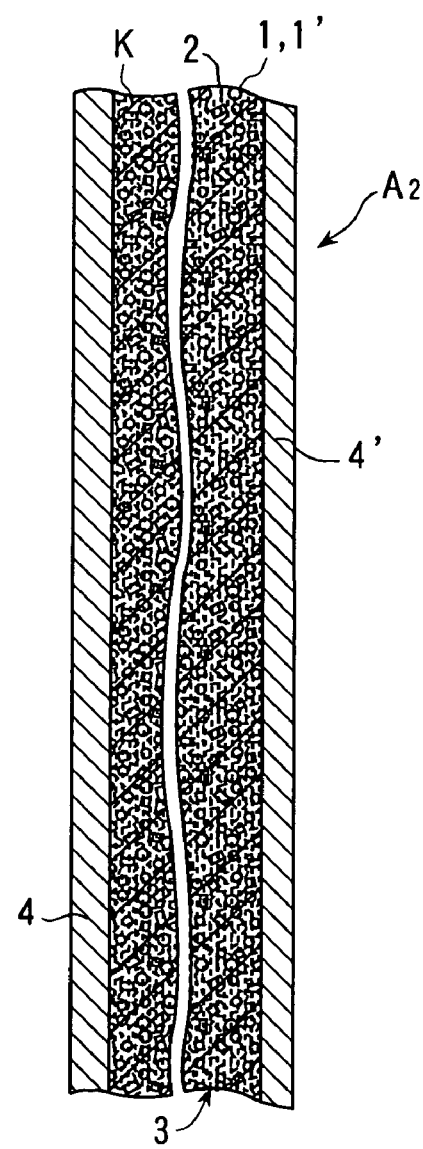
FIG. 3: Diagram illustrating an alternative embodiment of the building material of the present invention

Next, the metal wire contained in discarded used tires (T) as illustrated in FIG. 2 is removed, the tire is finely shredded as indicated in FIG. 3, producing small chips (1) mostly the size of a rice grain down to the size of a millet grain. This material may also be a powder state (1'). This is then combined with the above activated carbon component (K), hardened by the addition of the above plaster material (2) and clad by panel structures (4) and (4'), forming a building material ($A_2$) for ceiling use as a unit. This forms a building material (wall or ceiling use) with the fire resistant qualities of plaster material (2), that provides an odor prevention and deodorizing effect due to the above action of activated carbon component (K) as well as sound-proof, vibration-proof, insulating and other effects due to the inclusion of the chips (1) of discarded used tires (T).

Figure 4:
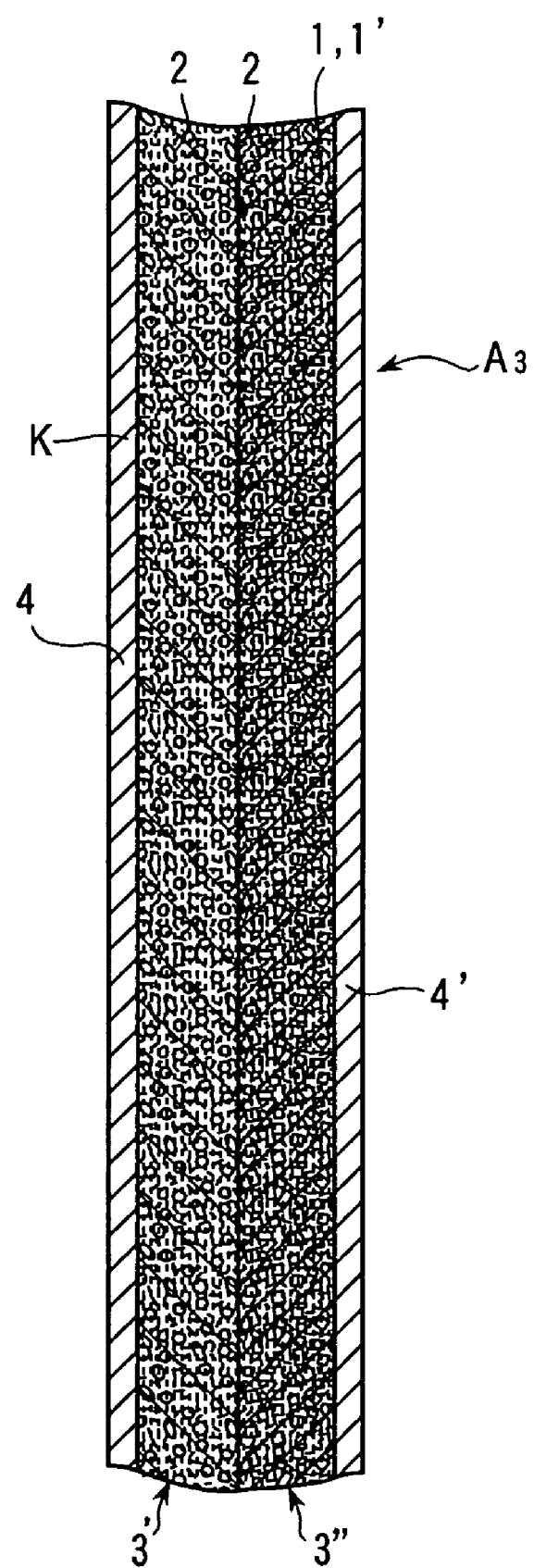
FIG. 4: Diagram illustrating another alternative embodiment of the building material of the present invention

Next, FIG. 4 illustrates building material ($A_3$) for wall or ceiling use for room interiors formed as a unit consisting of inner layer (3') consisting of the above activated carbon component (K) hardened by the addition of plaster material (2) and outer layer (3") consisting of chips (1) and powder (1') obtained by shredding discarded used tires hardened by the addition of plaster material (2) and clad by panel material (4) and (4').

Figure 5:
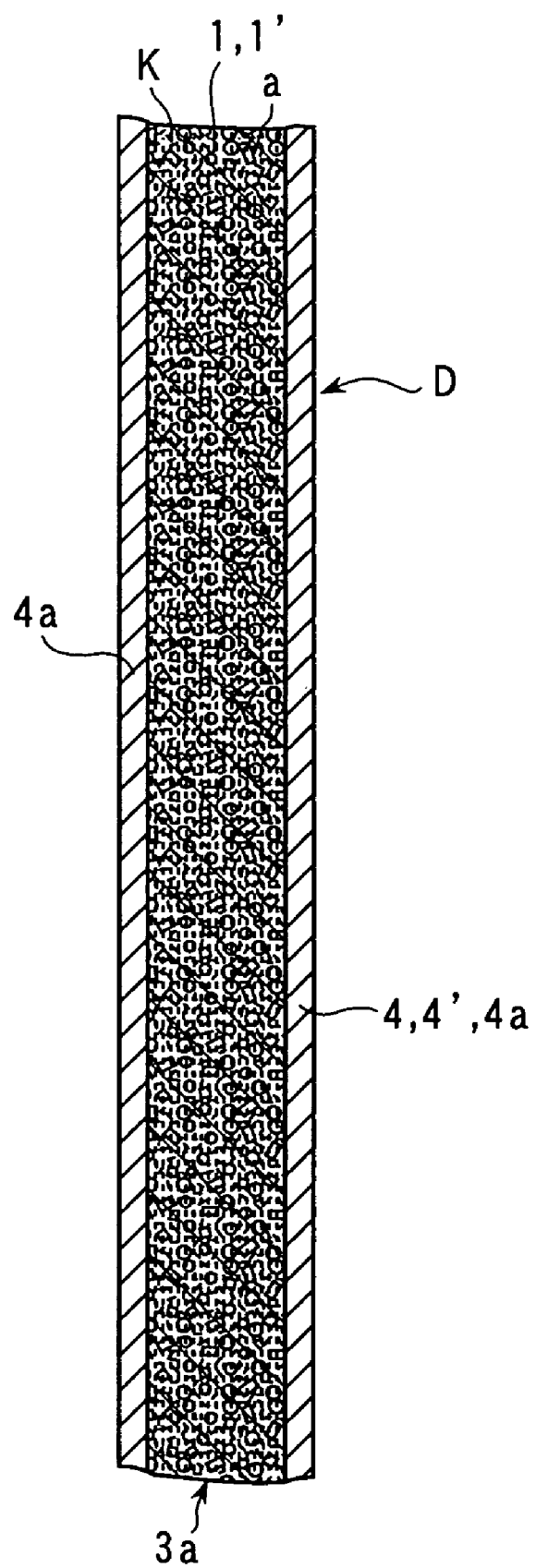
FIG. 5: Diagram illustrating another alternative embodiment of the building material of the present invention

Next, FIG. 5 illustrates door material (D) formed as a unit consisting of chips (1), etc., obtained by shredding discarded used tires and the above activated carbon component (K) obtained by drying coffee grounds subsequent to use as a coffee beverage or then further roasting and, if necessary, grinding them fixed in place with an appropriate adhesive (a) in appropriate proportions as laminated structure (3a) clad by panel structures (4) and (4') consisting of fancy wood paneling (4a) on one surface or both surfaces or, if on one surface, by veneer paneling on the other surface. A suitable adhesive for use here, for example, is the adhesive S235 manufactured by the U.S. company Armstrong (agent in Japan: ABC Trading Co., LTD., located in Nagata-cho, Chiyoda-ku, Tokyo). Besides that, various synthetic resin adhesives can also be used while natural adhesives would also be acceptable. The door material may also be formed by combining plaster material (2) described above in laminated structure (3a) without any adhesive. This would also make it possible to obtain a door material with a health orientation provided with sound-proof, vibration-proof and other effects as described above.

The above discarded used tires (T) are readily available in abundant quantities as a material for producing building materials ($A_1$)–($A_3$) and door material (D). and, when using such discarded old tires (T) in building materials ($A_1$)–($A_3$) and door material (D), they can be easily processed as chips or powder. Building materials ($A_1$)–($A_3$) and door material (D) obtained in this manner would basically possess the sound-proof and vibration-proof properties that building materials require and, in addition, they would also be effective materials with insulating properties and weatherproofing properties against heat, cold, etc. It would furthermore be possible to provide them with fire-retardant or fire-proof properties through the addition of plaster material (2).

It would moreover be possible to provide odor prevention and deodorizing effects through the action of activated carbon formed as a unit combined with a material obtained by roasting and grinding coffee beans and drying the resultant coffee grounds or then roasting and, if necessary, grinding them as activated carbon component (K). By utilizing a component that contains this activated carbon, it becomes possible to absorb the volatile component of organic adhesives that are used to apply wallpaper or other wall covering over it, which has adverse effects on health, provide odor prevention and deodorizing effects and prevent the adverse effects of the component while it remains volatile. In addition, utilizing a component that contains this activated carbon (K) will demonstrate the same effects if adhesive (a) used for laminated material (3a) at this time poses similar problems.

It is also possible to produce floor or tatami material by combining chipped and/or powdered material obtained by shredding discarded used tires and a material obtained by roasting and grinding coffee beans and drying the resultant coffee grounds or then further roasting and, if necessary, grinding them in a laminated structure fixed in place with an adhesive and clad on both surfaces by veneer paneling. It is furthermore possible to form a protective layer as a sick-house syndrome countermeasure by combining chipped and/or powdered material obtained by shredding discarded used tires and a material obtained by roasting and grinding coffee beans and drying the resultant coffee grounds and then further roasting and, if necessary, grinding them with an adhesive and spraying that directly or applying to interior room walls. If the above activated carbon is contained in these components, it will absorb the volatile component of organic chemical contaminants contained in wallpaper and other wall coverings, furnishings, carpets, curtains, wax, paint and so forth, which is the cause of the sick-house syndrome (indoor air pollution) and has an adverse effect on health, demonstrate an odor prevention and deodorizing effect and prevent the adverse effects of the component while it remains volatile.

Potential for industrial use

In this invention, discarded used tires are reutilized as a building material and, in a configuration that combines chips or powder obtained by shredding discarded used tires with plaster, it is possible to obtain building materials for walls, ceilings, etc., clad on both surfaces by paneling. Discarded used tires are increasing in quantity along with the increase in automobiles and, due to the lack of effective means for utilizing them, most of them are ultimately disposed of by incineration or other means and utilizing them as a recycled resource would truly be useful. As a material for producing building material, discarded used tires are readily available in abundant quantities and, when using them for that purpose, they can be easily processed for use and the building materials that are thus obtained basically have sound- and vibration-proof properties as well as insulating properties, thereby constituting effective building materials with weather-proof properties against heat, cold, etc., while also providing heat resistance, fire resistance and inflammability.

Using activated carbon as an additional material, it possible to obtain a building material that acts as a sick-house syndrome countermeasure since it becomes possible to absorb unwanted substances that are thought have an adverse effect on health while providing a odor prevention and deodorizing effect by forming a unit combining a material obtained by roasting and grinding coffee beans and drying the resultant coffee grounds or then further roasting and, if necessary, grinding them. Since it is possible to freely obtain the required dimensions in accordance with the use with such building materials, multipurpose use is possible. As described above, this invention is truly useful as a way of coping with the sick-house syndrome, which has been a cause of many problems, by using the coffee grounds that are generated in the production of coffee beverages, an industrial waste product that is discarded in enormous quantities everyday at plants that produce canned coffee beverages, and discarded used tires, also an industrial waste product that has outstanding sound- and vibration-proof properties, as new recycled resources.

I claim:

1. A laminated building structure utilizing recycled resources comprising:
   a material obtained by roasting and grinding coffee beans and, subsequent to use as a coffee beverage, one of drying resultant coffee grounds or then further roasting the coffee grounds,
   plaster added to harden the material, and
   first and second panels cladding opposite sides of the material.

2. A laminated building structure utilizing recycled resources as described in claim 1, wherein the first and second panels are each one of cardboard, veneer paneling, or fancy wood paneling.

3. A laminated building structure utilizing recycled resources comprising:
   an inner layer including (a) coffee grounds obtained by roasting and grinding coffee beans and, subsequent to use as a coffee beverage, one of drying resultant coffee grounds or then further roasting the coffee grounds and (b) plaster added to the coffee grounds to harden the coffee grounds,
   an outer layer adjacent the inner layer and including (a) one of a chipped, a powdered, or a chipped and powdered substance obtained by shredding discarded used tires and (b) plaster added to the substance to harden the substance, and
   inner and outer panels respectively cladding an inner surface of said inner layer and an outer surface of said outer layer.

4. A laminated building structure utilizing recycled resources as described in claim 3, wherein the inner and outer panels are each one of cardboard, veneer paneling, or fancy wood paneling.

5. A laminated door structure utilizing recycled resources comprising:
   a chipped, a powdered or a chipped and powdered substance obtained by shredding discarded used tires,
   a material obtained by roasting coffee beans, and one of drying resultant coffee grounds or then further roasting the coffee grounds,
   an adhesive which fixes in place the material and the substance,
   a fancy wood paneling clad on at least one surface of the fixed in place material and substance.

6. A laminated door utilizing recycled resources as described in claim 5, wherein the adhesive is plaster added to the material and the substance.

7. A laminated door structure as described in claim 5, wherein a surface opposite to the one surface is clad by a veneer paneling.

8. A laminated door utilizing recycled resources as described in claim 5, wherein a surface opposite to the one surface is clad by one of cardboard, veneer paneling, or fancy wood paneling.

9. An installation method utilizing recycled resources to form a protective layer comprising the steps of:
- combining (a) a material obtained by roasting and grinding coffee beans and by one of drying the resultant coffee grounds or then further roasting and grinding the coffee grounds with (b) an adhesive, and
- applying that combined material and adhesive to interior walls as a sick-house syndrome countermeasure.

10. An installation method utilizing recycled resources to form a protective layer as described in claim 9, wherein the applying step is performed by spraying of the combined material and adhesive onto the interior walls.

11. A laminated building structure utilizing recycled resources comprising:
- a material obtained by roasting and grinding coffee beans and, subsequent to use as a coffee beverage, one of drying resultant coffee grounds or then further roasting the coffee grounds,
- one of a chipped, a powdered or a chipped and powdered substance obtained by shredding discarded used tires,
- plaster added to harden the material and the substance, and
- first and second panels cladding opposite sides of the hardened material and substance.

12. A laminated building structure utilizing recycled resources as described in claim 11, wherein the first and second panels are each one of cardboard, veneer paneling, or fancy wood paneling.

13. A laminated floor utilizing recycled resources comprising:
- a chipped, a powdered or a chipped and powdered substance obtained by shredding discarded used tires,
- a material obtained by roasting coffee beans, and one of drying resultant coffee grounds or then further roasting the coffee grounds,
- an adhesive which fixes in place the material and the substance, and
- first and second veneer panels cladding opposite surfaces of the fixed in place material and substance.

14. A laminated tatami utilizing recycled resources comprising:
- a chipped, a powdered, or a chipped and powdered substance obtained by shredding discarded used tires,
- a material obtained by roasting coffee beans, and one of drying resultant coffee grounds or then further roasting the coffee grounds,
- an adhesive which fixes in place the material and the substance, and first and second veneer panels cladding opposite surfaces of the fixed in place material and substance.

* * * * *